(12) United States Patent
Suzuki

(10) Patent No.: US 8,786,903 B2
(45) Date of Patent: Jul. 22, 2014

(54) IMAGE DATA PROCESSING APPARATUSES, BOUNDARY DETECTION DEVICES, BOUNDARY DETECTION METHODS, AND COMPUTER-READABLE STORAGE MEDIA FOR DETECTING BOUNDARIES IN AN IMAGE

(71) Applicant: Brother Kogyo Kabushiki Kaisha, Nagoya (JP)

(72) Inventor: Katsuaki Suzuki, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 179 days.

(21) Appl. No.: 13/626,576

(22) Filed: Sep. 25, 2012

(65) Prior Publication Data

US 2013/0194589 A1  Aug. 1, 2013

(30) Foreign Application Priority Data

Jan. 31, 2012 (JP) ................................. 2012-018764

(51) Int. Cl.
*H04N 1/60* (2006.01)

(52) U.S. Cl.
USPC ............. 358/1.9; 358/1.2; 358/3.1; 358/3.22; 358/3.26; 358/3.27

(58) Field of Classification Search
CPC .............................. G06K 15/1871; H04N 1/58
USPC .......... 358/1.2, 1.9, 3.1, 3.22, 3.26, 3.27, 2.1, 358/465
See application file for complete search history.

(56) References Cited

U.S. PATENT DOCUMENTS

| | | | |
|---|---|---|---|
| 5,835,233 A | 11/1998 | Otsu et al. | |
| 2002/0070990 A1 | 6/2002 | Yamasaki et al. | |
| 2005/0179949 A1* | 8/2005 | Hagai | 358/3.03 |
| 2007/0217701 A1* | 9/2007 | Liu et al. | 382/234 |
| 2008/0049239 A1* | 2/2008 | Chiaki et al. | 358/1.9 |
| 2009/0116738 A1* | 5/2009 | Kubota | 382/165 |

FOREIGN PATENT DOCUMENTS

| | | |
|---|---|---|
| JP | H07-107280 A | 4/1995 |
| JP | 2002-292848 A | 10/2002 |
| JP | 2005-041041 A | 2/2005 |
| JP | 3727767 B2 | 12/2005 |
| JP | 2009-234158 A | 10/2009 |
| JP | 2010-115845 A | 5/2010 |
| JP | 4715622 B2 | 7/2011 |

* cited by examiner

*Primary Examiner* — Benny Q Tieu
*Assistant Examiner* — Quyen V Ngo
(74) *Attorney, Agent, or Firm* — Baker Botts L.L.P.

(57) ABSTRACT

Image boundary detection devices and methods include processes. Processes include setting an image recording mode to a second recording mode. First and second recording modes utilize first and second density values, respectively. Second density values are less than corresponding first density values. Processes include reducing first density values to second density values when the second recording mode is set. Processes include setting an image boundary determination threshold to one of a first and second threshold value when a respective one of the first and second recording mode is set. The second threshold value is less than the first threshold value. Processes include calculating density gradient values based on one of the first and second density value when the respective one of the first and second recording mode is set. Processes include determining whether pixels are image boundaries using density gradient values and the image boundary determination threshold.

13 Claims, 7 Drawing Sheets

SUB-SCAN DIRECTION

MAIN SCAN DIRECTION

Fig.5

| 1 | 2 | 0 | -2 | -1 |
|---|---|---|----|----|
| 2 | 4 | 0 | -4 | -2 |
| 1 | 2 | 0 | -2 | -1 |

~32

IMAGE DATA PROCESSING APPARATUSES, BOUNDARY DETECTION DEVICES, BOUNDARY DETECTION METHODS, AND COMPUTER-READABLE STORAGE MEDIA FOR DETECTING BOUNDARIES IN AN IMAGE

CROSS REFERENCE TO RELATED APPLICATION

This application claims priority to Japanese Patent Application No. 2012-018764, filed on Jan. 31, 2012, the disclosure of which is incorporated herein by reference.

BACKGROUND OF THE INVENTION

1. Field of the Invention

The present invention relates generally to image processing and more specifically to image data processing apparatuses, boundary detection devices, boundary detection methods, and computer-readable storage media for detecting boundaries in an image.

2. Description of Related Art

A liquid ejection apparatus that ejects ink onto a recording medium, in accordance with input image data, that forms an image is known. The liquid ejection apparatus includes an image data processing apparatus. The image data processing apparatus detects a contour line of the image formed on the recording medium (i.e., a boundary of the image) and reduces the size of a droplet of the ejected ink when the boundary is formed. As a result, blurring at the boundary is avoided and a contour of the image is sharpened.

A liquid ejection apparatus that prints an image in an ink saving mode also is known. The ink saving mode is a mode of printing an entire image at a uniformly reduced density level that typically reduces an amount of ink used during the printing process.

The image printed in the ink saving mode has a reduced color intensity compared to an image printed in an ordinary mode. Further, the amount of ink used during printing in the ink saving mode is expected to be less than the amount of ink used during printing in the ordinary mode. For example, when an image, such as a landscape photograph, is printed in the ink saving mode, the amount of ink used during printing typically is reduced in comparison with the amount of ink that would be used during printing of the landscape photograph in the ordinary mode.

Generally, a setting of how far the density level is to be reduced is set when setting the ink saving mode. When a reduced density level is selected, the image is printed with reduced color intensity. Typically, the amount of ink used also is reduced.

SUMMARY OF THE INVENTION

In some cases, however, the amount of ink used may not be reduced, even when the image is printed in the ink saving mode. Such a phenomenon may occur when an image comprising characters as the greatest constituent elements thereof is printed in the ink saving mode.

The cause of the above-mentioned phenomenon may reside in process of detecting a boundary region of the image. Specifically, the size of the ejected ink droplet may be reduced for pixels in the boundary region, which may form the contour of the image, to avoid blurring of the ink in the boundary region and to sharpen the image contour. Whether some pixel is present in the boundary region may be determined by measuring a density gradient of the relevant pixel from a density change between the relevant pixel and other pixels surrounding the former and by checking whether the measured density gradient exceeds a threshold.

Nevertheless, when the density level of the entire image is uniformly decreased each image density value of a set of image density values is decreased) in the ink saving mode, the density gradient also may be uniformly lowered. In some scenarios, a pixel that is detected as present in the boundary region when a liquid ejection apparatus is in the ordinary mode may not be detected as present in the boundary region when the liquid ejection apparatus is in the ink saving mode. Consequently, the size of the ink droplet ejected at the boundary region corresponding to the relevant pixel may not be changed to a reduced size.

Accordingly, even when the density level of the entire image is uniformly reduced in the ink saving mode, the amount of ink used may not be reduced as desired. Thus, undesired effects caused by the above-described non-detection of the boundary region may increase greatly when the image comprises characters as the greatest constituent elements thereof because such an image may comprise a great number of pixels at the boundary regions (e.g., each character comprises a great number of boundary regions, and the image comprises a great number of characters; whereas a landscape image comprises a lesser number of boundary regions).

An image data processing apparatus, a boundary detection device for image data, a boundary detection method, and a computer-readable storage device storing a computer-executable program disclosed herein may provide a technique with which a pixel in an original image that may be detected as present in the boundary region when the liquid ejection apparatus is in the ordinary mode also may be reliably detected as present in the boundary region when a density level of an image is reduced (e.g., in the ink saving mode).

An image data processing apparatus disclosed herein may comprise a memory, a mode information receiving device, and a controller. The mode information receiving device may be configured to receive information specifying a second recording mode that is different from a first recording mode. The controller may be configured to execute various processes. In particular, the controller may be configured to execute a process of setting an image recording mode for recording an image on a recording medium to the second recording mode when the mode information receiving device receives the information specifying the second recording mode. The image may be recorded on the recording medium with a second set of image density values when the image recording mode is set to the second recording mode. The image may be recorded on the recording medium with a first set of image density values when the image recording mode is set to the first recording mode. Each image density value of the second set of image density values may be less than a corresponding image density value of the first set of image density values. Further, the controller may be configured to execute a process of storing image data corresponding to the image in the memory. The image data may comprise a first density value for each pixel of a plurality of pixels arrayed in a matrix. The first density value may correspond to the first recording mode. Moreover, the controller may be configured to execute a process of converting the first density value for each pixel comprised in the image data to a second density value that is less than the first density value when the second recording mode is set as the image recording mode. In addition, the controller may be configured to execute a process of setting an image boundary determination threshold to one of first threshold value and at least one second threshold value.

The image boundary determination threshold may be set to the first threshold value when the first recording mode is set as the image recording mode. The image boundary determination threshold may be set to the at least one second threshold value when the second recording mode is set as the image recording mode. The at least one second threshold value may be less than the first threshold value. Further still, the controller may be configured to execute a process of calculating a density gradient value for each pixel comprised in the image data based on one of the first density value for the each pixel and the second density value for the each pixel. The density gradient value may be calculated based on the first density value for the each pixel when the first recording mode is set as the image recording mode. The density gradient value may be calculated based on the second density value for the each pixel when the second recording mode is set as the image recording mode. Further yet, the controller may be configured to execute a process of determining whether each pixel comprised in the image data corresponds to a boundary of the image based on the density gradient value for the each pixel and the image boundary determination threshold. Still further yet, the controller may be configured to execute a process of generating driving data for an image recording apparatus such that an amount of recording material to be recorded on a region of the recording medium corresponding to each pixel when the each pixel corresponds to a boundary of the image is less than an amount of recording material to be recorded on the region of the recording medium corresponding to the pixel when the pixel does not correspond to a boundary of the image. The driving data may be based on the first density value for each pixel comprised in the image data when the first recording mode is set as the image recording mode. The driving data may be based on the second density value for each pixel comprised in the image data when the second recording mode is set as the image recording mode.

An image boundary detection device disclosed herein may comprise a memory, a mode information receiving device, and a controller. The mode information receiving device may be configured to receive information specifying a second recording mode that is different from a first recording mode. The controller may be configured to execute various processes. In particular, the controller may be configured to execute a process of setting an image recording mode for recording an image on a recording medium to the second recording mode when the mode information receiving device receives the information specifying the second recording mode. The image may be recorded on the recording medium with a second set of image density values when the image recording mode is set to the second recording mode. The image may be recorded on the recording medium with a first set of image density values when the image recording mode is set to the first recording mode. Each image density value of the second set of image density values may be less than a corresponding image density value of the first set of image density values. Further, the controller may be configured to execute a process of storing image data corresponding to the image in the memory. The image data may comprise a first density value for each pixel of a plurality of pixels arrayed in a matrix. The first density value may correspond to the first recording mode. Moreover, the controller may be configured to execute a process of converting the first density value for each pixel comprised in the image data to a second density value that is less than the first density value when the second recording mode is set as the image recording mode. In addition, the controller may be configured to execute a process of setting an image boundary determination threshold to one of a first threshold value and a second threshold value. The image boundary determination threshold may be set to the first threshold value when the first recording mode is set as the image recording mode. The image boundary determination threshold may be set to the second threshold value when the second recording mode is set as the image recording mode. The second threshold value may be less than the first threshold value. Further still, the controller may be configured to execute a process of calculating a density gradient value for each pixel comprised in the image data based on one of the first density value for the each pixel and the second density value for the each pixel. The density gradient value may be calculated based on the first density value for the each pixel when the first recording mode is set as the image recording mode. The density gradient value may be calculated based on the second density value for the each pixel when the second recording mode is set as the image recording mode. Further yet, the controller may be configured to execute a process of determining whether each pixel comprised in the image data corresponds to a boundary of the image based on the density gradient value for the each pixel and the image boundary determination threshold.

A boundary detection method disclosed herein may comprise performing certain processes. In particular, the boundary detection method may comprise a process of storing image data corresponding to an image in a memory, the image data comprising a first density value for each pixel of a plurality of pixels arrayed in a matrix. The first density value may correspond to a first recording mode. Further, the boundary detection method may comprise a process of receiving information specifying a second recording mode that is different from the first recording mode. Moreover, the boundary detection method may comprise a process of setting an image recording mode for recording an image on a recording medium to the second recording mode when the information specifying the second recording mode is received. The image may be recorded on the recording medium with a second set of image density values when the image recording mode is set to the second recording mode. The image may be recorded on the recording medium with a first set of image density values when the image recording mode is set to the first recording mode. Each image density value of the second set of image density values may be less than a corresponding image density value of the first set of image density values. In addition, the boundary detection method may comprise a process of converting the first density value for each pixel comprised in the image data to a second density value that is less than the first density value when the second recording mode is set as the image recording mode. Further still, the boundary detection method may comprise a process of setting an image boundary determination threshold to one of a first threshold value and a second threshold value. The image boundary determination threshold may be set to the first threshold value when the first recording mode is set as the image recording mode. The image boundary determination threshold may be set to the second threshold value when the second recording mode is set as the image recording mode. The second threshold value may be less than the first threshold value. Further yet, the boundary detection method may comprise a process of calculating a density gradient value for each pixel comprised in the image data based on one of the first density value for the each pixel and the second density value for the each pixel. The density gradient value may be calculated based on the first density value for the each pixel when the first recording mode is set as the image recording mode. The density gradient value may be calculated based on the second density value for the each pixel when the second recording triode is set as the image recording mode. Still further yet, the boundary detection method may comprise a process of determining whether each pixel comprised in the image data corresponds to a boundary of the image based on the density gradient value for the each pixel and the image boundary determination threshold.

A computer-readable storage medium disclosed herein may store computer-readable instructions therein. The computer-readable instructions may be configured to instruct a processor to execute certain processes. In particular, the computer-readable instructions may be configured to instruct a processor to execute a process of storing image data corresponding to an image in a memory, the image data comprising a first density value for each pixel of a plurality of pixels arrayed in a matrix. The first density value may correspond to a first recording mode. Further, the computer-readable instructions may be configured to instruct a processor to execute a process of receiving information specifying a second recording mode that is different from the first recording mode. Moreover, the computer-readable instructions may be configured to instruct a processor to execute a process of setting an image recording mode for recording an image on a recording medium to the second recording mode when the information specifying the second recording mode is received. The image may be recorded on the recording medium with a second set of image density values when the image recording mode is set to the second recording mode. The image may be recorded on the recording medium with a first set of image density values when the image recording mode is set to the first recording mode. Each image density value of the second set of image density values may be less than a corresponding image density value of the first set of image density values. In addition, the computer-readable instructions may be configured to instruct a processor to execute a process of converting the first density value for each pixel comprised in the image data to a second density value that is less than the first density value when the second recording mode is set as the image recording mode. Further still, the computer-readable instructions may be configured to instruct a processor to execute a process of setting an image boundary determination threshold to one of a first threshold value and a second threshold value. The image boundary determination threshold may be set to the first threshold value when the first recording mode is set as the image recording mode. The image boundary determination threshold may be set to the second threshold value when the second recording mode is set as the image recording mode. The second threshold value may be less than the first threshold value. Further yet, the computer-readable instructions may be configured to instruct a processor to execute a process of calculating a density gradient value for each pixel comprised in the image data based on one of the first density value for the each pixel and the second density value for the each pixel. The density gradient value may be calculated based on the first density value for the each pixel when the first recording mode is set as the image recording mode. The density gradient value may be calculated based on the second density value for the each pixel when the second recording mode is set as the image recording mode. Still further yet, the computer-readable instructions may be configured to instruct a processor to execute a process of determining whether each pixel comprised in the image data corresponds to a boundary of the image based on the density gradient value for the each pixel and the image boundary determination threshold.

When a recording material saving mode (e.g., an ink saving mode, a second recording mode) is set, a threshold fir the density gradient value may be reduced compared to the threshold for the density gradient value when the ordinary recording mode is set. Therefore, it reliably may be determined for each pixel whether the each pixel of the image data corresponds to a boundary of the image data, even when the image data is printed at a reduced density in the recording material saving mode.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present disclosure, needs satisfied thereby, and the objects features, and advantages thereof, reference now is made to the following descriptions taken in connection with the accompanying drawings.

FIG. 5 is a schematic view of a filter element.

DETAILED DESCRIPTION OF EMBODIMENTS OF THE INVENTION

Embodiments of the present invention now are described with reference to the drawings. As used herein, the expressions "upward" and "downward" may correspond to directions defined along a vertical direction. Ink may be used as a practical example of a liquid, and a sheet of paper P may be used as a practical example of a recording medium. Nevertheless, the present invention may not be limited to such ink as a liquid or such a sheet of paper P as a recording medium, and other compatible liquids and recording media may be used interchangeably therewith. Further, an ink jet recording apparatus for printing an image on the paper P with the ink may be used as an example of a liquid ejection apparatus; however, the present invention may not be limited to such an ink jet recording apparatus, and other compatible liquid ejection apparatus may be used interchangeably therewith.

Moreover, in configurations of such embodiments, direct printing may be performed as an exemplary mode of printing. As used herein, the term "direct printing" may correspond to a printing mode of printing image data in a memory card when an information recording device (e.g., the memory card) comprising the image data recorded therein is attached to the ink jet recording apparatus.

Structure of the Ink Jet Recording Apparatus

Figure 1:
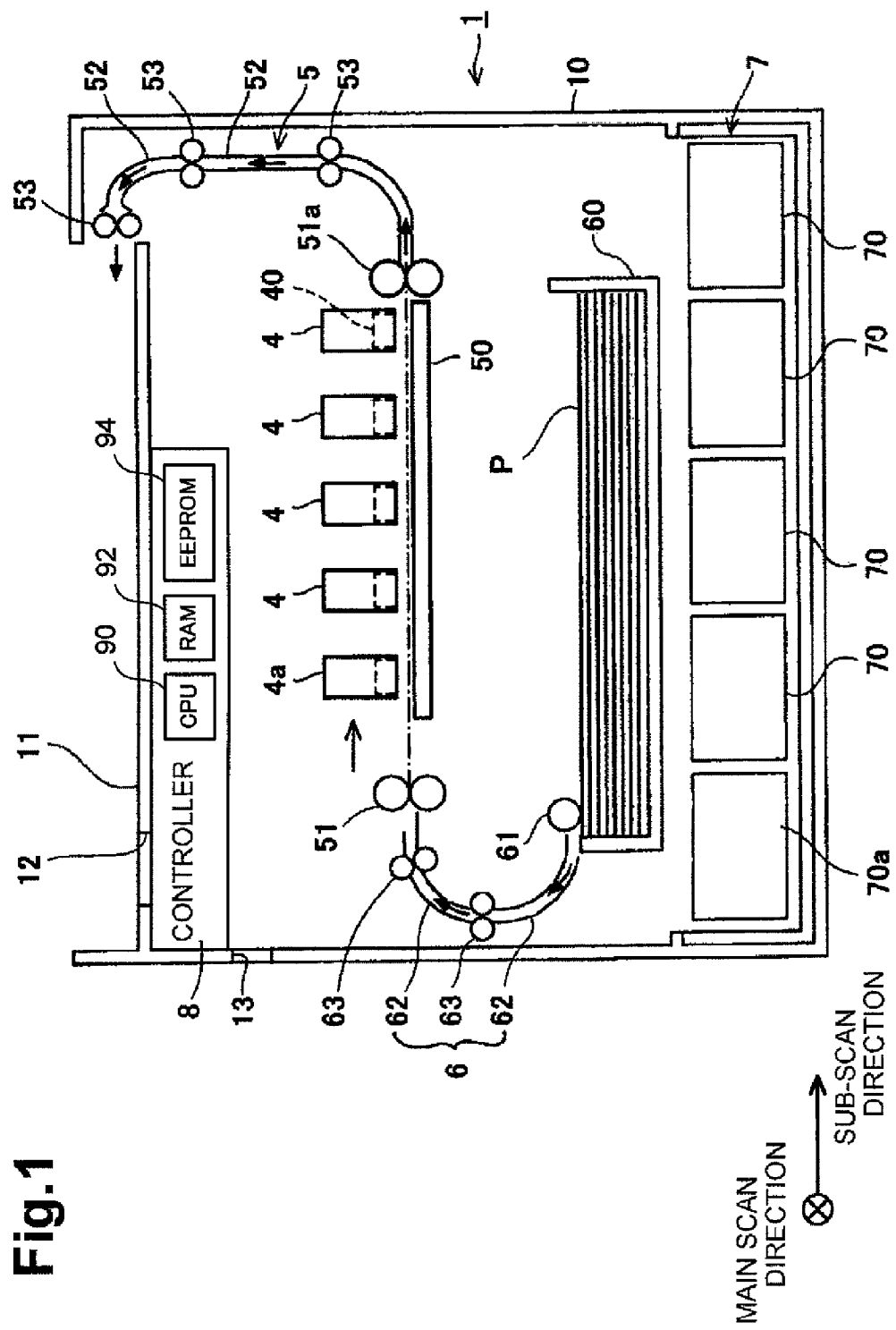
FIG. 1 is a schematic view showing an internal structure of an ink jet recording apparatus.

As shown in FIG. 1, an ink jet recording apparatus 1 may comprise a rectangular parallelepiped housing 10, and a paper discharge portion 11 may be disposed on an upper surface of a top plate of the housing 10. Housing 10 may comprise heads 4, a conveying device 5, a paper feed device 6, and a tank group 7 arranged therein. The heads 4 may eject droplets of inks in colors comprising one or more of black, cyan, magenta, and yellow toward the paper P. The conveying device 5 may convey the paper P horizontally along a conveying direction and may send the paper P to the paper discharge portion 11. The paper feed device 6 may feed the paper P to the conveying device 5. The tank group 7 may comprise a plurality of tanks 70 comprising inks in the respective colors, which may be horizontally arrayed side by side, A treatment liquid head 4a for ejecting a treatment liquid to the paper P prior to the ejection of the inks may be disposed downstream of a conveying roller 51 of the conveying device 5 in the conveying direction and upstream of the heads 4 in the conveying direction. The treatment liquid used herein may be applied to the paper P before ejecting the inks to the paper P, and the treatment liquid may act to promote one or more of aggregation and precipitation of ink components, which may maintain high printing quality or improve the printing quality. The tank group 7 further may comprise a treatment liquid tank 70a storing the treatment liquid.

A controller 8 configured to control operations of various mechanisms and electrical circuits inside the housing 10 may be disposed in an upper portion of the housing 10 at a position which may not interfere with liquid ejection from the heads 4. An insertion slot 13 may be disposed in a lateral surface of the housing 10 at a position under the controller 8. An information recording device (e.g., a memory card) may be inserted into the insertion slot 13. An image signal from the information recording device may be input into the controller 8.

An operation panel 12, which may be connected electrically to the controller 8, may be disposed on the upper surface of the housing 10. One of an ordinary recording mode (e.g., a first recording mode), in which an image may be printed on the paper P without reducing a density of liquid ejected onto the paper P, and an ink saving mode (e.g., a second recording mode), in which the image may be printed on the paper P using a reduced density of liquid ejected onto the paper P, may be set through operation the operation panel 12.

The conveying device 5 may comprise a mechanism for conveying the paper P from one side of the ink jet recording apparatus 1 to another side of the ink jet recording apparatus 1, as shown by the arrows in FIG. 1. As described herein and as shown in FIG. 1, a direction in which the paper P is conveyed in a printing region (e.g., a region between conveying rollers 51 and 51a) may be referred to as a sub-scan direction, and a direction perpendicular to the sub-scan direction in a horizontal plane (e.g., a plane normal to the vertical direction) may be referred to as a main scan direction.

The conveying device 5 may comprise a platen 50, and conveying rollers 51 and 51a may be disposed on respective sides of the platen 50. The conveying roller 51 may be disposed on the upstream side of the platen 50 in the conveying direction and may apply a conveyance force to the paper P, wherein the paper P may be conveyed along the platen 50 while the paper P is supported on an upper surface of the platen 50. The conveying roller 51a may be disposed on the downstream side of the platen 50 in the conveying direction and may apply a conveyance force to the paper P after passing the platen 50, wherein the paper P may be conveyed to the paper discharge portion 11 through a guide 52 and an advancing roller 53, which may be positioned between the conveying roller 51a and the paper discharge portion 11.

The paper feed device 6 may comprise a paper feed tray 60 and a paper feed roller 61. Two guides 62 and an advancing roller 63 may be disposed between the paper feed roller 61 and the conveying device 5. The paper feed roller 61 may extract the paper P in the uppermost position within the paper feed tray 60 and may convey the relevant paper P toward the upstream side of the conveying device 5 through the guides 62 and the advancing roller 63.

For example, each of the heads 4 may comprise a line head with a substantially rectangular parallelepiped shape and may extend in the main scan direction. A lower surface of each head 4 may comprise a nozzle surface 40 in which many liquid ejection ports for ejecting the ink therethrough may be formed. The individual heads 4 may be connected, respectively, through tubes (not shown) to the tanks 70, which may correspond to the colors of the inks to be ejected. The ink may be ejected in the form of droplets from the liquid ejection ports in the nozzle surface 40. Each time the ink is ejected, the ink may be ejected as one of three types of droplets, which may be classified based on a diameter size of each droplet (e.g., a large droplet, a medium droplet, and a small droplet).

Configuration of the Controller

Figure 2:
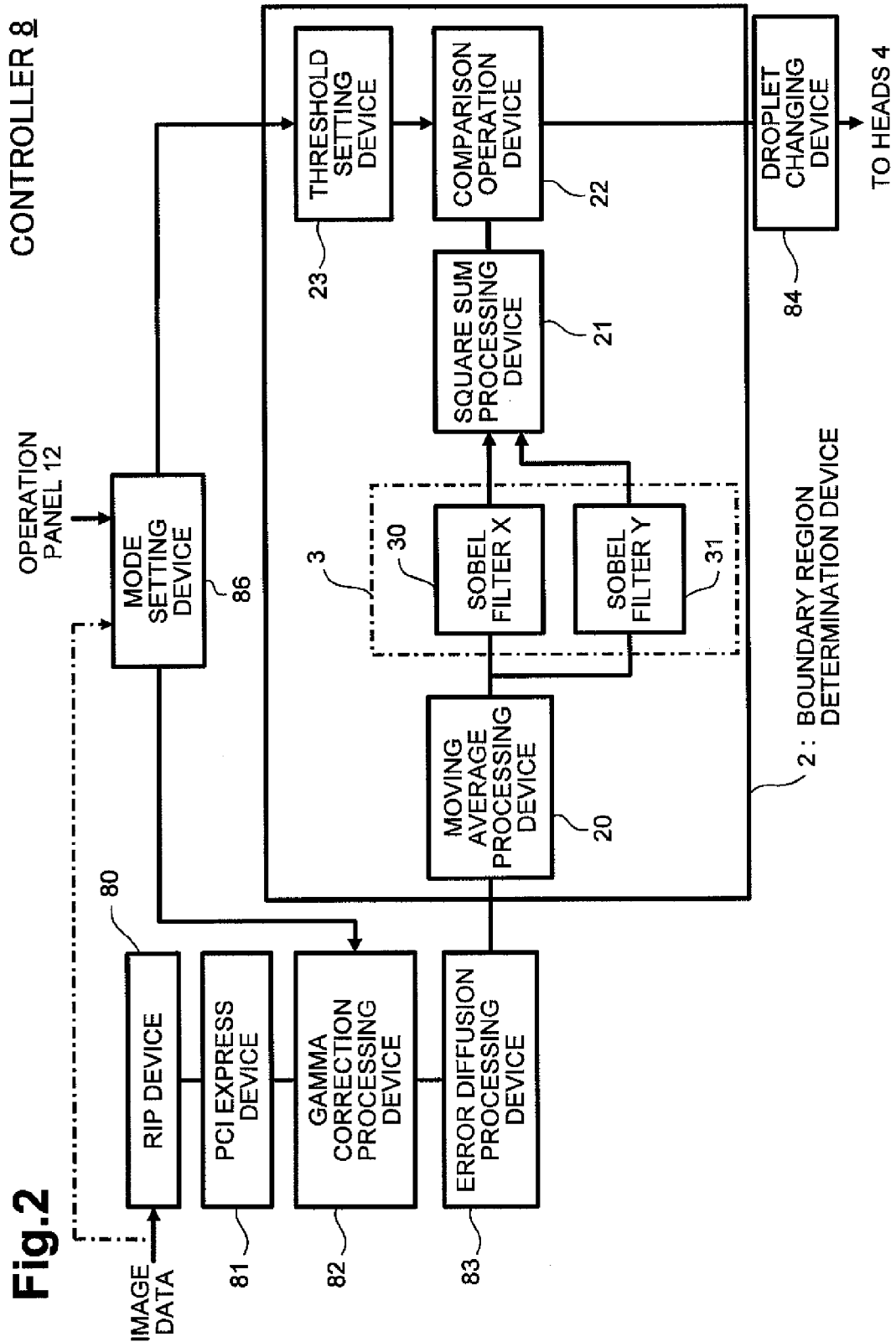
FIG. 2 is a block diagram showing an internal configuration of a controller for the ink jet recording apparatus of FIG. 1.

FIG. 2 is a block diagram showing an internal configuration of a controller for the ink jet recording apparatus 1 of FIG. 1. The controller 8 may comprise an raster image processing ("RIP") device 80, a peripheral component interconnect ("PCI") express device 81 serving as a high-speed serial interface, a gamma correction processing device 82, an error diffusion processing device 83, a boundary region determination device 2, and a droplet changing device 84, which may be encountered successively by an image signal input from the information recording device in the respective order depicted in FIG. 2. The droplet changing device 84 may be connected to the heads 4.

The controller 8 may comprise one or more computing devices (e.g., a computer). Each computer may comprise a central processing unit ("CPU") 90; an electrically erasable and programmable read only memory ("EEPROM") 94 that may store, in a rewritable manner, computer-readable instructions that may be configured to be executed by the CPU 90 and data used by the computer-readable instructions; a random access memory ("RAM") 92 that may store temporarily data that is used by the CPU 90 when executing the computer-readable instructions; an interface for connecting the CPU 90 to an external device; internal paths interconnecting the formers; and other components (each of the above-described components is not shown). The computer-readable instructions to be executed by the CPU 90 may be stored in any of various storage media, such as a flexible disk, a CD-ROM, and a memory card. The computer-readable instructions may be installed into the EEPROM 94 from the relevant storage medium. Various types of processing in the above-mentioned processing devices, the boundary region determination device 2, and the droplet changing device 84 may be realized when the CPU 90 executes the computer-readable instructions installed into the EEPROM 94.

The boundary region determination device 2 may comprise a moving average processing device 20 comprising a memory; a filter device 3, a square sum processing device 21, and a comparison operation device 22, which may be successively disposed inside the boundary region determination device 2 along a path followed by the image signal. The comparison operation device 22 may be connected to a threshold setting device 23 and the droplet changing device 84. The filter device 3 may comprise a Sobel filter X 30, which may be a differential filter in the main scan direction, and a Sobel filter Y 31, which may be a differential filter in the sub-scan direction. The Sobel filter X 30 and the Sobel filter Y 31 may be arranged in parallel. A mode setting device 86 may be connected to the gamma correction processing device 82 and the threshold setting device 23. The mode setting device 86 further may be connected to the operation panel 12 such that the mode setting device 86 may set a recording mode of the ink jet recording apparatus 1 to the ink saving mode when an instruction to set the ink saving mode is input into the operation panel 12. In addition, the mode setting device 86 may set the recording mode of the ink jet recording apparatus 1 to the ordinary recording mode when an instruction to set the ink saving mode is not input into the to the operation panel 12. When the ink jet recording apparatus 1 is set to the ink saving mode, the gamma correction processing device 82 and the threshold setting device 23 may perform operations to reduce an amount of ink used when recording an image as compared to an amount of ink used when recording the image in an ordinary printing mode.

The threshold setting device 23 may comprise a table, and the table may store thresholds corresponding to the squares of density gradient values for pixels (described below). More specifically, the table in the threshold setting device 23 may store a first threshold (e.g., threshold A), which may correspond to the ordinary recording mode, and a second threshold (e.g., threshold B), which may correspond to the ink saving mode. The value of the threshold B may be less than the value of the threshold A. The threshold setting device 23 may be disposed in a control circuit (not shown), which may supervise one or more of head control, paper feed, paper discharge operations, and other operations.

The image data transmitted from the information recording device may be input to the RIP processing device 80 first. The image data may be written in the page description language, for example. The RIP processing device 80 may execute the known RIP process on the input image data, wherein the image data may be converted to bit map data representing pixels which may be arrayed in the form of a matrix corresponding to a printable region of the paper P. The bit map data may be output from the RIP processing device 80 as data representing each pixel in 8 bits (e.g., in 256 density values from 0 to 255). The bit map data may be transmitted to the gamma correction processing device 82 through the PCI express device 81. The gamma correction processing device 82 may convert the 8-bit input data into 10-bit data (e.g., data represented in 1024 density values from 0 to 1023 and may output the converted data. By outputting the bit map data with an additional of 2 bits of information, a density control process, such as an error diffusion process, may be performed with greater accuracy. The image data and the bit map data may be stored in, for example, the above-described RAM. The density value may be defined as a pixel value corresponding to each pixel. The density value may not be limited to a particular size of bit, even when the density value is expressed in the particular type of bit.

Figure 3:
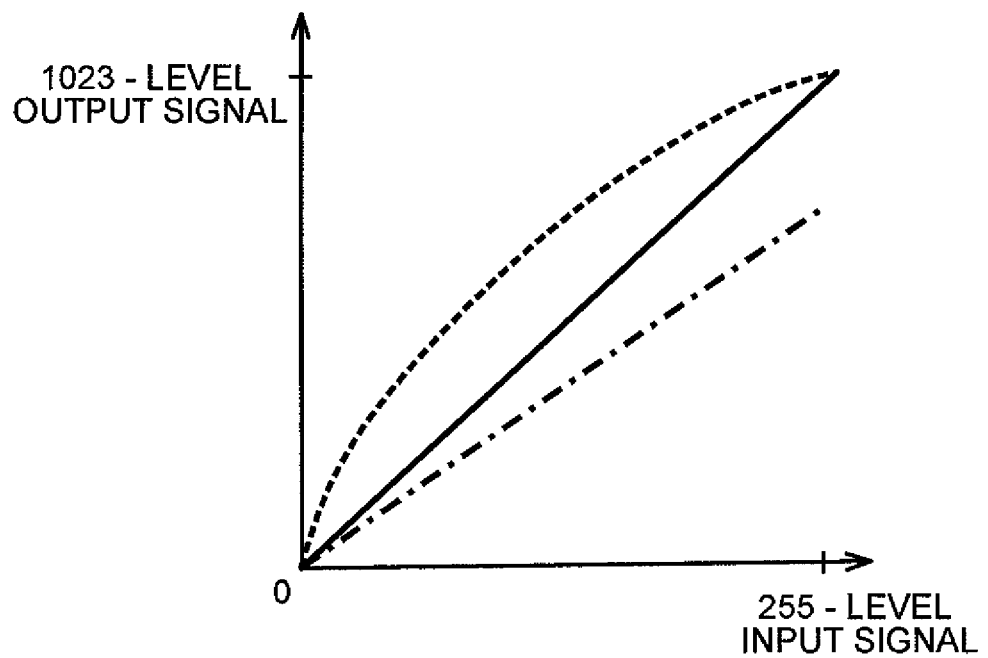
FIG. 3 is a graph showing the relationship between respective values of an input signal level and an output signal level in a gamma correction processing device.

FIG. 3 is a graph showing the relationship between an input signal to the gamma correction processing device 82 and an output signal therefrom. The input signal and the output signal are indicated by the vertical axis and the horizontal axis of the graph, respectively. In FIG. 3, a 0 value may indicate a white color, whereas a 255 value in the horizontal axis and a 1023 value in the vertical axis may indicate a black color. It may be desirable that the relationship between the input signal and the output signal may be linear, as shown by a solid line in but the actual relationship between the input signal and the output signal may become non-linear, as shown by a curved dotted line in FIG. 3. When the relationship between the input signal and the output signal becomes non-linear, the gamma correction processing device 82 may correct that relationship to a linear one. The curve shown by the dotted line in FIG. 3 is convex upwards; however, the curve may be convex downwards (e.g., recessed) in some scenarios.

When the ink saving mode is set by the mode setting device 86, the gamma correction processing device 82 may reduce a ratio of correspondence between the input signal and the output signal (e.g., reduce the slope of an oblique line representing the relationship between the input signal and the output signal). In particular, the gamma correction processing device 82 may reduce the ratio between the input signal and the output signal such that the input signal values in the horizontal axis may be converted to output signal values by multiplying the corresponding output signal values in the vertical axis (e.g., the output signal values along the solid line in FIG. 3) by a coefficient that is less than 1, as represented by a one-dot-chain line in FIG. 3. For example, when the coefficient is 0.8, ratio between the input signal and the output signal may be reduced, such that the 255 values in the horizontal axis may be converted to 818 values (e.g., 1023×0.8 818) in the vertical axis. As described above, a greater amount of the ink may be used at a greater density level. Thus, a total amount of ink used in printing an image on the paper P may be reduced by uniformly reducing a level of the output signal in the ink saving mode. Consequently, when a level of the input signal does not change, the value of the output signal in the ink saving mode may be less than the value of the output signal in the ordinary recording mode.

The image data representing each pixel in 10 bits (e.g., the 10-bit data) and the output from the gamma correction processing device 82 (e.g., the bit map data) may be transmitted to the error diffusion processing device 83, as shown in FIG. 2. The error diffusion processing device 83 may convert the input image data to image data representing a value of each pixel using one of four values (e.g., four-valued image data). At that time, the error diffusion processing device 83 may reduce a density error between input image data and output image data by diffusing a density error between a particular pixel and other pixels, which surround the particular pixel, to the other surrounding pixels. In the four-valued image data output from the error diffusion processing device 83, each pixel may be expressed using 2 bits (e.g., by one of four types of values, such as "00," "01," "10," and "11").

The four types of values may be "00," "01," "10," and "11," and the four types of values may correspond to density values of the pixel. In the ink jet recording method, the four types of values further may correspond to the sizes of the ink droplet because the density value of the pixel may depend on the presence or the absence of the ink droplet and may be proportional to and the size of the ink droplet. More specifically, "00" may correspond to non-ejection of the droplet, "01" may correspond to a small droplet, "10" may corresponds to a medium droplet, and "11" may correspond to a large droplet.

Figure 4A:
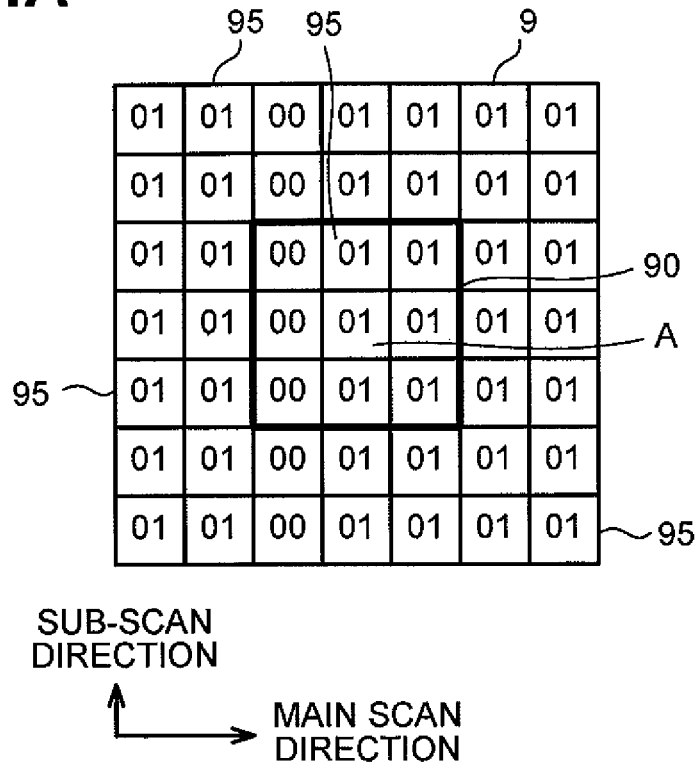
FIGS. 4A and 4B each show a schematic view of exemplary image data representing pixels that are arrayed in the form of a matrix.
Figure 4B:
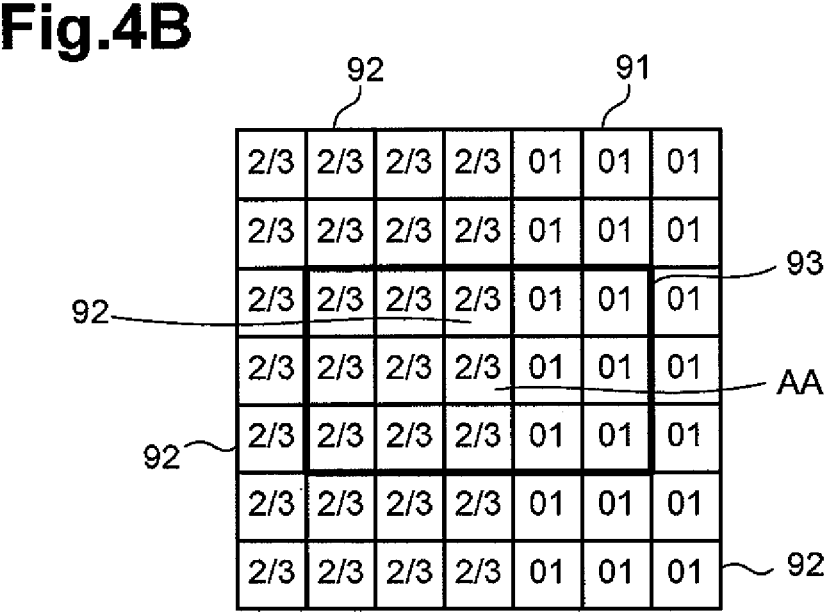

The four-valued image data output from the error diffusion processing device 83 may be transmitted to the moving average processing device 20 and may be stored temporarily in the memory inside the moving average processing device 20. Operations of the moving average processing device 20, the filter device 3, and the square sum processing device 21 are described below. FIGS. 4A and 4B each show a schematic view of image data 9 that may be stored in the memory inside the moving average processing device 20, and FIGS. 4A and 4B each represent pixels 95 that may be arrayed in the form of a matrix. For convenience, FIGS. 4A and 4B show an example of image data 9 in which only the pixels 95 corresponding to "00" and "01" are arrayed therein.

The moving average processing device 20 may process the pixels arrayed in the main scan direction. In the image data 9, for example, a pixel 95 positioned at a center of the matrix may be defined as a center pixel. In FIG. 4A, the center pixel is denoted by a character A. The moving average processing device 20 subsequently may demarcate an averaging region 90 where three pixels 95 to be printed in the main scan direction and three pixels 95 to be printed in the sub-scan direction may be arrayed in the form of a matrix with the pixel A being at the center. Further, the moving average processing device 20 may calculate an average value of density values of the pixels 95 within the averaging region 90. Because six pixels 95 within the averaging region 90 shown in FIG. 4A are "01" and the other three pixels 95 are "00," an average value of the density values of the pixels 95 within the averaging region 90 may be ⅔.

By utilizing each piece of the image data 9 stored in the memory inside the moving average processing device 20, the moving average processing device 20 may create averaged image data 91, as shown in FIG. 4B, based on the average value of the density values of the pixels 95. Such a moving average process may average the density value of each pixel 95 together with the density values of surrounding pixels, which may reduce problems during a boundary determining process, described later, (e.g., the moving average process may prevent the boundary determination process from being adversely affected by an independent point adjacent to a boundary of the image). The averaged image data 91 may comprise calculation pixels 92, which may be used in a calculation, and which are arrayed in the form of a matrix. A calculation center pixel AA, which may be used in a calculation, may be positioned at a center of a matrix comprising the calculation pixels 92. The calculation center pixel AA may correspond to the above-mentioned center pixel A. Each of the density values of each calculation pixel 92 may correspond to the result of averaging the density values of the pixels 95 in the averaging region 90. Consequently, each calculation pixel 92 may correspond to a moving average determined for an averaging region (e.g., averaging region 90) with a pixel 95 at the center, wherein the pixel 95 and each calculation pixel 92 are disposed at corresponding positions in respective matrices.

In the averaged image data 91 shown in FIG. 49, the calculation pixels 92, which are positioned on the right side of the calculation center pixel AA, may have the density value of "01." The calculation pixels 92, which are positioned on the left side of the calculation center pixel AA, may have the density value of ⅔ (e.g., the average value of the density values of the pixels 95), which was calculated by the moving average processing device 20.

The density value data obtained with the moving average process executed in the moving average processing device 20 subsequently may be subjected to a filtering process in the Sobel filter X 30.

Figure 5:
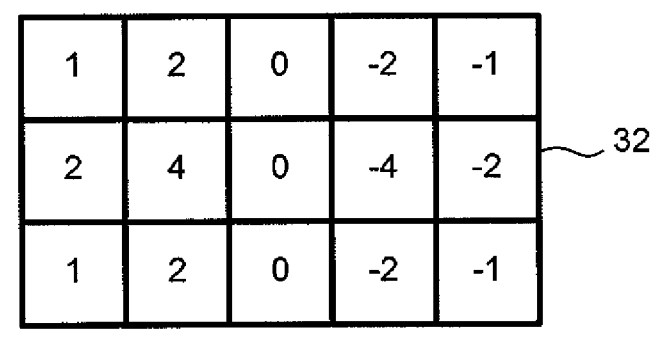

The Sobel filter X 30 may comprise a filter element 32 in which coefficients may be arrayed in the form of a matrix, as shown in FIG. 5. The number of rows and the number of columns of the matrix in the filter element 32 may be equal to those M a first processing region. 93 in FIG. 49. The Sobel filter X 30 may superimpose the filter element 32 on the first processing region 93. The coefficient ("0" in FIG. 5) positioned at a center of the filter element 32 may be superimposed on the calculation center pixel AA in the first processing region 93 thereby multiplying the density value of the calculation center pixel AA by the relevant coefficient. At the same time, the density values of the pixels positioned around the calculation center pixel AA may be multiplied by the corresponding coefficients of the filter element 32, which may be superimposed on those surrounding pixels, respectively. The multiplied values (e.g., the results of each multiplication of a density value in the first processing region 93 and a corresponding coefficient in the filter element 32) may be summed to obtain a boundary determination value along the main scan direction for the calculation center pixel AA. The boundary determination value may represent a density gradient value for the calculation center pixel AA in the main scan direction.

The Sobel filter Y 31 also may comprise a filter element (not shown) in which coefficients may be arrayed in the form of a matrix. Similar to the Sobel filter X 30, the Sobel filter Y 31 may multiply the density values of each of the calculation pixels in a second processing region a (processing region similar to the first processing, region 93) by the corresponding coefficient of another filter element (e.g., a filter element similar to filter element 32), respectively, each of which may be superimposed on a corresponding calculation pixel in the first processing region. The multiplied values (e.g., the results of each multiplication of a density value in the second processing region and a corresponding coefficient in the other filter element) may be summed to obtain a boundary determination value along in the sub-scan direction for the calculation center pixel AA. The boundary determination value may represent a density gradient value for the calculation center pixel AA in the sub scan direction.

The boundary determination value along the main scan direction and the boundary determination value along the sub-scan direction, each of which may be obtained for the calculation center pixel AA as described above, both may be transmitted to the square sum processing device 21 in FIG. 2. The square sum processing device 21 may obtain a first square value by squaring the boundary determination value in the main scan direction. Further, the square sum processing device 21 may obtain a second square value by squaring the boundary determination value in the sub scan direction. The square sum processing device 21 may add the first square value and the second square value together to obtain a square sum of the boundary determination value, and then the square sum processing device 21 may transmit the square sum to the comparison operation device 22. The square sum of the boundary determination values is obtained because the boundary determination value may take a negative value in some cases, and the square sum may be a positive number regardless of whether the corresponding boundary determination value is negative or positive. Consequently, a comparison with a threshold in a subsequent step, which may be difficult or may cause errors if the boundary determination value is negative, may be simplified.

The comparison operation device 22 may compare the square sum the boundary determination values with a threshold that may be transmitted from the threshold setting device 23 and that may correspond to the square of the density gradient value. When the square sum of the boundary determination values exceeds the threshold, a density difference between the calculation center pixel AA and other calculation pixels surrounding the calculation center pixel AA may be great. Consequently, the comparison operation device 22 may determine that the center pixel A corresponding to the calculation center pixel AA corresponds to a boundary region. In accordance with the determination result of the comparison operation device 2, the droplet changing device 84 may set the ink droplet to the small droplet when the image data for the pixels around the center pixel A is printed. As a result, blurring (e.g., feathering) on the paper P may be avoided when the boundary region is printed. Further, the boundary region of the printed image may be sharpened. As described herein, setting the ink droplet to the small droplet may correspond to changing one or more of the two values "10" and "11" among the above-described four types of values to the value "01." Thus, as described below, ink ejection data for setting the ink droplet to the small droplet may be generated based on the value "01." The moving average processing device 20 may repeat the above-described operations by setting another pixel that is displaced from the center pixel A in the main scan direction or the sub-scan direction, such as, for example, another pixel 95, as a new center pixel A.

Figure 6:
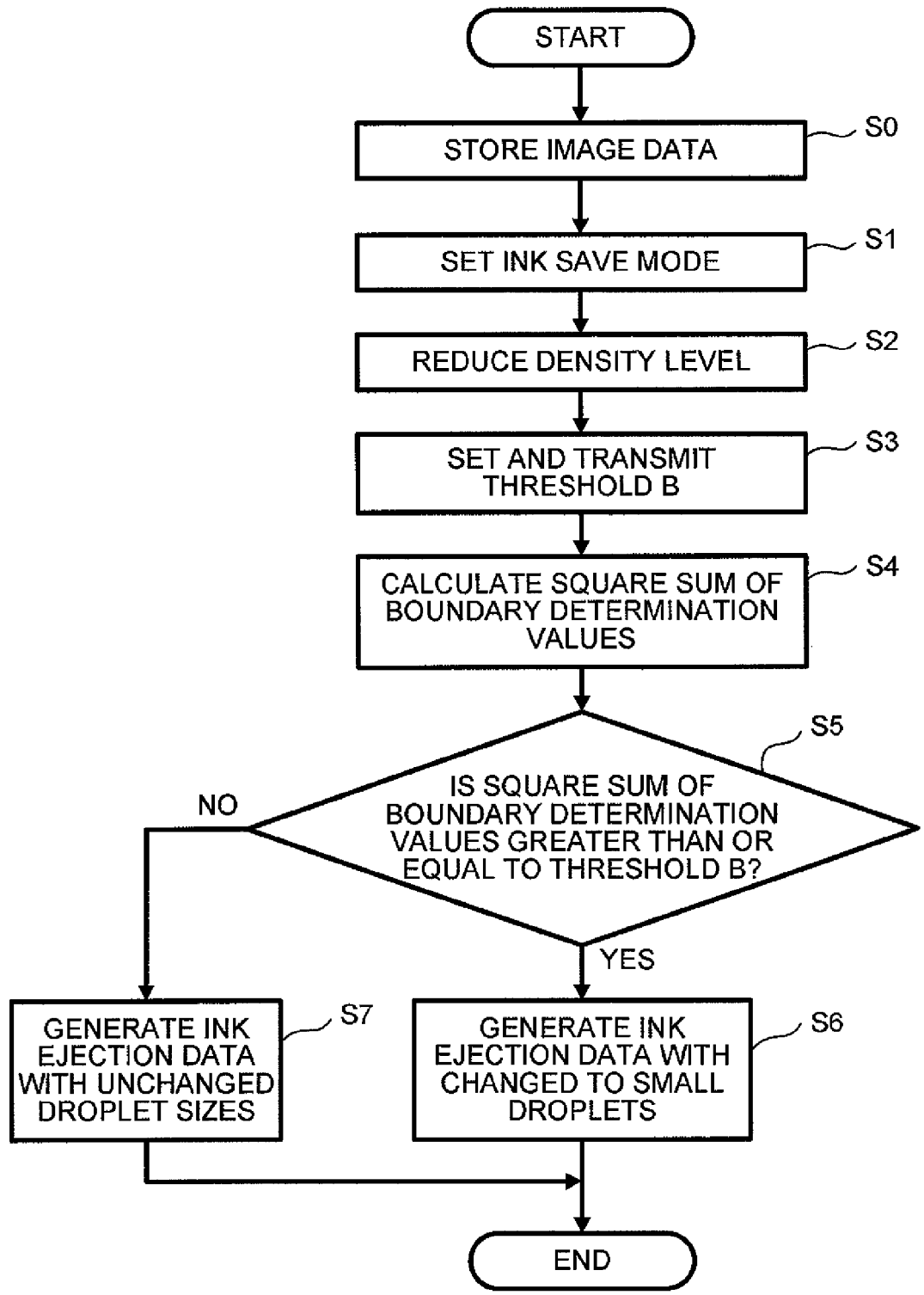
FIG. 6 is a flowchart showing an operating process of a boundary region determination device when the ink jet recording apparatus of FIG. 1 is set in an ink saving mode.

In the ink saving mode, because the density level is reduced by the gamma correction processing device 82, the density gradient values calculated by the Sobel filter X 30 and the Sobel filter Y 31 (e.g., the boundary determination values) also may be reduced. When the threshold for the square sum of the boundary determination values remains set to the threshold A after the boundary determination values have been reduced, the square sum of the boundary determination values may be less than the threshold A in some scenarios when the center pixel A corresponds to the boundary region. Thus, the boundary region may not be determined correctly. Consequently, the ink droplet may not be set to the small droplet, and the ink may blur on the paper P when the image data for the pixels around the pixel corresponding to the boundary region is printed. Another problem may be that the ink may not be saved in spite of the ink saving mode being set. In view of the above-described problems, the boundary region determination device 2 may operate in accordance with the flowchart shown in FIG. 6 when the ink saving mode is set.

Ink Saving Mode

The image data may be stored in the RAM 92 (Step S0). When the ink saving mode is set and processing of image data is initiated (e.g., via a printing command) using the operation panel 12 (Step S1), the mode setting device 86 may transmit information expressing the printing command to the gamma correction processing device 82 and the threshold setting device 23. The gamma correction processing device 82 may reduce a ratio of correspondence between the input signal and the output signal as shown, for example, by the one-dot-chain line in FIG. 3. In particular, the gamma correction processing device 82 may reduce the density value of each pixel the density value to be output), such that an amount of ink used in the printing process may be reduced (Step S2). The error diffusion processing device 83 may convert the image data output from the gamma correction processing device 82 to data representing, for example, a monochrome four-valued image. The data representing the four-valued image output from the error diffusion processing device 83 may comprise data representing each pixel expressed by a value in 2 bits, as described above.

As noted above, the threshold setting device 23 may comprise a table of threshold values for each of the printing modes (e.g., the ink saving mode and the ordinary recording mode) incorporated therein. Further, the threshold setting device 23 may read the threshold B corresponding to the ink saving mode from the table incorporated therein, in accordance with the information from the mode setting device 86 (e.g., when the printing mode is set to the ink saving mode). Consequently, the threshold setting device 23 may set an image boundary determination threshold to the threshold B, which may be a value less than the value of the threshold A corresponding to the ordinary recording mode, and the threshold setting device 23 may transmit the value of the threshold B to the comparison operation device 22 (Step S3).

The density gradient value (e.g., the boundary determination value) of each pixel may be calculated by the moving average processing device 20 and the filter device 3 (e.g., the Sobel filter X 30 and the Sobel filter Y 31), and the square sum of the boundary determination values may be calculated by the square sum processing device 21 (Step S4). The calculated square sum of the boundary determination values may be transmitted to the comparison operation device 22.

The comparison operation device 22 may compare the square sum of the boundary determination values with the threshold B (Step S5). When the square sum of the boundary determination values is greater than or equal to the threshold B, the difference in density between the calculation center pixel AA and the other calculation pixels 92 surrounding the calculation center pixel AA may be great. Consequently, the comparison operation device 22 may determine that the center pixel A corresponding to the calculation center pixel AA corresponds to the boundary region. Specifically; the comparison operation device 22 may transmit an "on" signal when the comparison operation device 22 may determine that the center pixel A corresponding to the calculation center pixel AA corresponds to the boundary region. Accordingly; when the comparison operation device 22 determines that the square sum of the boundary determination values is greater than or equal to the threshold B (Step S5: Yes), the comparison operation device 22 may transmit an "on" signal to the droplet changing device, and the droplet changing device 84 may generate ink ejection data (e.g., driving data) instructing the ink jet recording device 1 to use the small droplet when the image data for the pixels around the center pixel A is printed (Step S6). Thereafter, the ink corresponding to the pixels around the center pixel A may be ejected in the small droplets onto the paper P from each of the heads 4. As a result, blurring on the paper P may be reduced when the boundary region is printed.

When it is determined in step S5 that the square sum of the boundary determination values is less than the threshold B (Step S5: No), the difference in density between the calculation center pixel AA and the other calculation pixels 92 surrounding the calculation center pixel AA may be small. Consequently, the comparison operation device 22 may determine that the center pixel A corresponding to the calculation center pixel AA does not correspond to the boundary region, and the comparison operation device 22 may transmit an "off" signal to the droplet changing device 84. Accordingly, when the comparison operation device 22 determines that the square sum of the boundary determination values is less than the threshold B (Step S5: No), the comparison operation device 22 may transmit an "off" signal to the droplet changing device, and the droplet changing device 84 may generate ink ejection data instructing the ink jet recording device 1 to maintain a droplet size (e.g., generate droplets without changing the sizes of the droplets) when the image data for the pixels around the center pixel A is printed (Step S7). Thereafter, the moving average processing device 20 may repeat the above-described operations (e.g., Steps S1-S5 and S6 or S7) using another pixel that is displaced from the center pixel A in one or more of the main scan direction and the sub-scan direction as a new center pixel A.

In the above-described configurations, when the ink saving mode is set, the threshold B for the density gradient value of each pixel may be set to be less than the threshold A when the ordinary recording mode is set. Accordingly, ink jet recording device 1 reliably may determined whether the pixel in the image data corresponds to the boundary of the image data when the density associated with the image data is reduced in the ink saving mode. Thus, the amount of ink used may be reduced when the boundary is printed in the ink saving mode.

In the above-described configurations, the boundary region determination device 2 may read the threshold B in accordance with the information indicating that the ink saving mode has been set by the mode setting device 86, and the boundary region determination device 2 may compare the threshold B with the square sum of the boundary determination values to determine whether the center pixel A corresponding to the calculation center pixel AA corresponds to the boundary region. Thus, the boundary detection device may comprise the mode setting device 86 and the boundary region determination device 2. Further, the droplet changing device 84 may change the ink ejection data based on a result of the boundary determination performed by the boundary region determination device 2 (e.g., Step S5). Thus, the image data processing apparatus may comprise the droplet changing device 84, the mode setting device 86, and the boundary region determination device 2.

As described above, the moving average processing device 20 and the filter device 3 may obtain the density gradient value using the first processing region 93, which may comprise the calculation center pixel AA, and the second processing region. Accordingly, when the density gradient value of the calculation center pixel AA is greater than or equal to a certain value, it may be determined that the calculation center pixel AA and one or more of the calculation pixels 92 adjacent to the calculation center pixel AA correspond to the boundary region of the image. When a pixel region comprising the calculation center pixel AA and the one or more of the calculation pixels 92 adjacent to the calculation center pixel AA corresponds to the boundary region of the image, the relevant pixel region may be a first type of boundary.

Further, in the above-described configurations, when the density gradient exists but is less than the certain value (e.g., when there is a difference in density between the calculation center pixel AA and the other calculation pixels 92 surrounding the calculation center pixel AA), it may be determined that the calculation center pixel AA corresponds to the boundary region of the image and the other surrounding calculation pixels 92 are present on the inner side of the image, with respect to the boundary region. When a pixel region comprising only the calculation center pixel AA is determined to correspond to the boundary region of the image, the relevant pixel region may be a second type of boundary.

Figure 7:
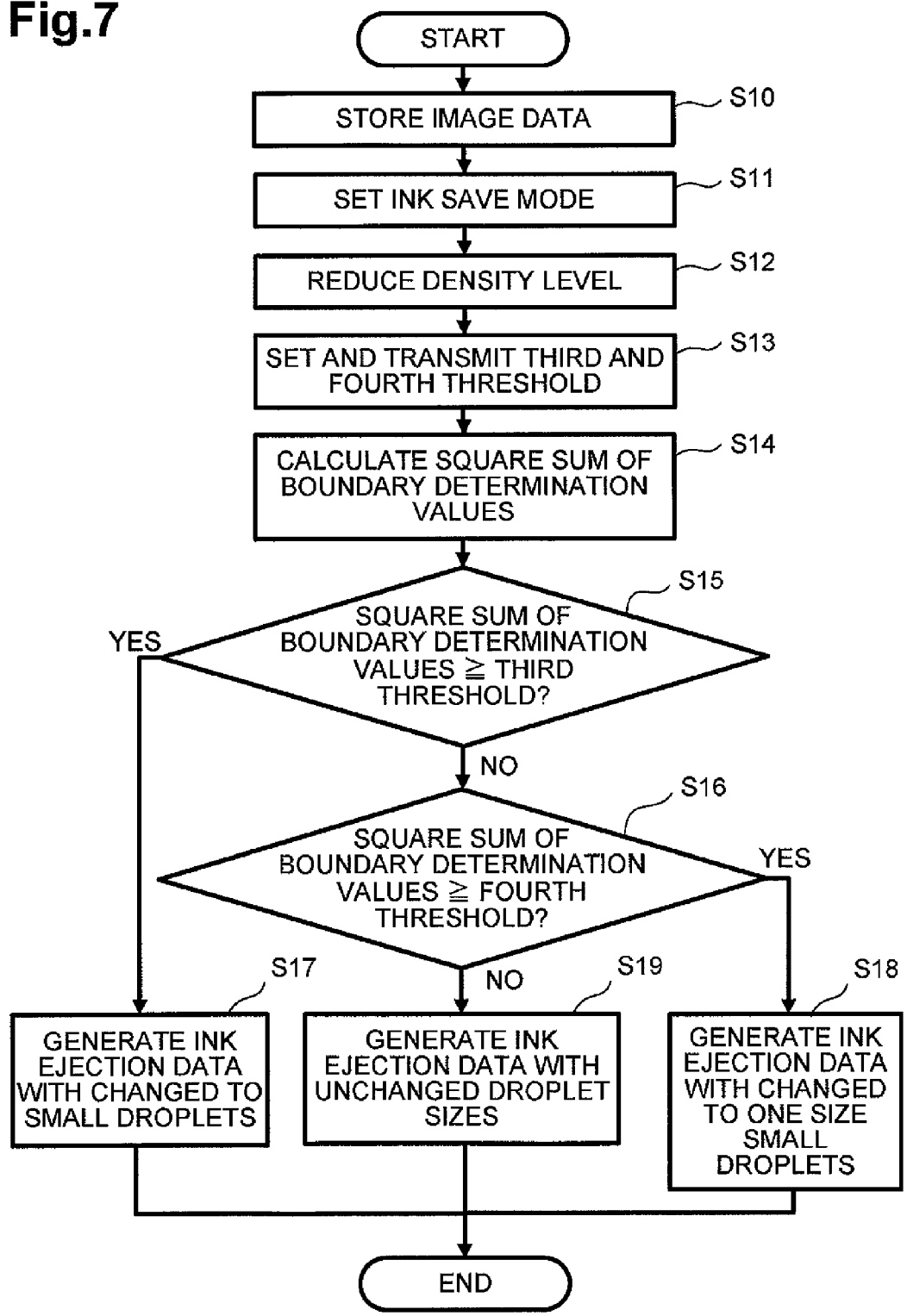
FIG. 7 is a flowchart showing an operating process of a boundary region determination device according to another configuration when the ink jet recording apparatus of FIG. 1 is set in an ink saving mode.

Moreover, a third threshold (e.g., a particular second threshold) and a fourth threshold (e.g., another second threshold) that is less than the third threshold both may be set as candidates for the threshold B, corresponding to an ink saving mode, in the threshold setting device 23. The third threshold may correspond to the first type of boundary, and the fourth threshold may correspond to the second type of boundary. In certain configurations, the boundary region determination device 2 may operate in accordance with the flowchart shown in FIG. 7 when the ink saving mode is set.

The image data may be stored in the RAM 92 (Step S10). When the ink saving mode is set and processing of image data is initiated (e.g., via a printing command) using the operation panel 12 (Step S11), the mode setting device 86 may transmit information expressing the printing command to the gamma correction processing device 82 and the threshold setting device 23. The gamma correction processing device 82 may reduce a ratio of correspondence between the input signal and the output signal as shown, for example, by the one-dot-chain line in FIG. 3. In particular, the gamma correction processing device 82 may reduce the density value of each pixel (e.g., the density value to be output), such that an amount of ink used in the printing process may be reduced (Step S12). The error diffusion processing device 83 may convert the image data output from the gamma correction processing device 82 to data representing, for example, a monochrome four-valued image. The data representing the four-valued image output from the error diffusion processing device 83 may comprise data representing each pixel expressed by a value in 2 bits, as described above.

As noted above, the threshold setting device 23 may comprise a table of threshold values for each of the printing modes incorporated therein. Further, the threshold setting device 23 may read the third threshold and the fourth threshold corresponding to the ink saving mode from the table incorporated therein, in accordance with the information from the mode setting device 86 (e.g., when the printing mode is set to the ink saving mode). Consequently, the threshold setting device 23 may set an image boundary determination threshold to one or more of the third threshold and the fourth threshold, which may be a value less than the value of the threshold A corresponding to the ordinary recording mode, and the threshold setting device 23 may transmit the values of the third threshold and the fourth threshold to the comparison operation device 22 (Step S13).

The density gradient value (e.g., the boundary determination value) of each pixel may be calculated by the moving average processing device 20 and the filter device 3 (e.g., the Sobel filter X 30 and the Sobel filter Y 31), and the square sum of the boundary determination values may be calculated by the square sum processing device 21 (Step S14). The calculated square sum of the boundary determination values may be transmitted to the comparison operation device 22.

The comparison operation device 22 may determine whether the square sum of the boundary determination values is greater than or equal to the third threshold (Step S15). In the ink saving mode, when the comparison operation device 22 determines that the square sum of the boundary determination values is greater than or equal to the third threshold (Step S15: Yes), the comparison operation device 22 may determine that the pixel region comprising the calculation center pixel AA and the other calculation pixels 92 adjacent to the calculation center pixel AA is the boundary region. Consequently, the comparison operation device 22 may determine that the calculation center pixel AA is positioned at the first type of boundary.

Accordingly, when the droplet changing device 84 initially generates ink ejection data corresponding to the large droplet or the medium droplet for a position determined to be the first type of boundary, the comparison operation device 22 may change the ink ejection data to instruct the ink jet recording device 1 to use the small droplet when the ink jet recording device 1 prints the pixel region comprising the calculation center pixel AA and the other calculation pixels 92 adjacent to the calculation center pixel AA. Therefore, the droplet changing device 84 may change the ink ejection data such that the ink is ejected in small droplets onto the paper P from each of the heads 4 at the first type of boundary (Step S17). As a result, blurring may be avoided when the boundary region of the image is printed at the first type of boundary.

When the comparison operation device 22 determines that the square sum of the boundary determination values is less than the third threshold (Step S15: No), the comparison operation device 22 may determine whether the square sum of the boundary determination values is greater than or equal to the fourth threshold (Step S16). In the ink saving mode, when the comparison operation device 22 determines that the square sum of the boundary determination values is greater than or equal to the fourth threshold (Step S16: Yes) and less than the third threshold (Step S15: No), the comparison operation device 22 may determine that the pixel region comprising only the calculation center pixel AA is the boundary region. Consequently, the comparison operation device 22 may determine that the calculation center pixel AA is positioned in the second type of boundary.

Accordingly, when the droplet changing device 84 initially generates the ink ejection data corresponding to the large droplet for a position determined to be the second type of boundary, the droplet changing device 84 may change the ink ejection data to instruct the ink jet recording device 1 to use the medium droplet when the ink jet recording device 1 prints the pixel region comprising the calculation center pixel AA (Step S18). When the droplet changing device 84 initially generates the ink ejection data corresponding to the medium droplet for a position determined to be the second type of boundary, the droplet changing device 84 may change the ink ejection data to instruct the ink jet recording device 1 to use the small droplet when the ink jet recording device 1 prints the pixel region comprising the calculation center pixel AA (Step S18). Thus, the size of the ejected ink may be reduced to the next-greatest size in Step S18. Consequently, the droplet changing device 84 may change the ink ejection data such that the ink is ejected from each of the heads 4 onto the paper P as either the medium droplet or the small droplet.

When it is determined in Step S16 that the square sum of the boundary determination values is less than the fourth threshold (Step S16: No), the difference in density between the calculation center pixel AA and the other calculation pixels 92 surrounding the calculation center pixel AA may be small. Consequently, the comparison operation device 22 may determine that the center pixel A corresponding to the calculation center pixel AA does not correspond to the boundary region. Accordingly, when the comparison operation device 22 determines that the square sum of the boundary determination values is less than the fourth threshold (Step S16: No), the droplet changing device 84 may generate ink ejection data instructing the ink jet recording device 1 to maintain a droplet size (e.g., generate droplets without changing the sizes of the droplets) when the image data for the pixels around the center pixel A is printed (Step S19). Thereafter, the moving average processing device 20 may repeat the above-described operations (e.g., Steps S11-S19) using another pixel that is displaced from the center pixel A in one or more of the main scan direction and the sub-scan direction as a new center pixel A.

When the pixel region comprising only the calculation center pixel AA is the boundary region, the other surrounding calculation pixels 92 may be present on the inner side of the image, with respect to the boundary region. Therefore, when the size of the ejected ink droplet is reduced substantially, the printed image may become unclear. This problem may be reduced or eliminated by reducing the size of the droplet of the ejected ink to the next-greatest size, rather than to the smallest size.

As a result of preparing two thresholds as described above, when one pixel corresponds to the boundary region, blurring of the ink in the boundary region may be avoided more reliably by ejecting the ink in the small droplet. Further, when one pixel is positioned near the boundary region and the one pixel corresponds to a position on the inner side, with respect to the boundary region, an image corresponding to the one pixel may be printed sharply.

When the fourth threshold is set to an excessively reduced value, the comparison operation device 22 may falsely detect the boundary region of the image when the square sum of the boundary determination values is a value comparable to the fourth threshold. Consequently, the fourth threshold again may be set to a value not exceeding the third threshold.

Modifications

The direct printing has been described above as one example of printing; however, the technical features of the boundary detection device and the image data processing apparatus described above may be applicable to an ink jet recording apparatus 1 that is connected to an information transmitting apparatus, such as a personal computer ("PC") via a cable or a wireless local area network ("LAN"), for example. Image data transmitted from the information transmitting apparatus may be printed by one or more of a storage printing operation and an ordinary printing operation. The storage printing operation may comprise printing in which the printing is started when an authentication condition is input to the ink jet recording apparatus 1 via the information transmitting apparatus. The ordinary printing operation may comprise printing in which the image data input from the information transmitting apparatus is printed by the ink jet recording apparatus 1 according to the input sequence of the image data.

When the image is printed in the storage printing operation and the ink saving mode is to be set, the operation panel 12 may be used to set the ink saving mode as in the above-described configurations because the storage printing operation also may require that the operation panel 12 be used to input the authentication condition into the ink jet recording apparatus 1. In the ordinary printing operation, the image data may comprise information instructing the ink jet recording apparatus 1 to perform printing in the ink saving mode instruction to set the ink saving mode). Thus, in the ordinary printing operation, which may be represented by the one-dot-chain line in FIG. 2, the image data may be input directly into the mode setting device 86, and the ink saving mode may be set in accordance with the information comprised in the image data.

When the information transmitting apparatus is a PC, the boundary region of the image may be detected in the PC in some configurations. In such configurations, one or more of the processes shown in FIG. 2 may be in the PC. When the information transmitting apparatus is a PC and the ink saving mode is to be set, the operation panel 12 may be used to set the ink saving mode. Alternatively or additionally, a screen of the PC or a keyboard associated with the PC may be used to input an instruction to set the ink saving mode in the ink jet recording apparatus 1, which may be transmitted to the ink jet recording apparatus 1. In many such configurations, a printer driver that is installed in the PC may be used to generate and instruction to set the ink saving mode and to generate the printing instruction to print the image data, each of which subsequently may be transmitted to a printer (e.g., the ink jet recording device 1).

While the coefficient used in the gamma correction processing device 82 to reduce the ratio of correspondence between the input signal and the output signal may be set to 0.8 as described above, the coefficient is not limited to such a value, and the coefficient may comprise a value less than or greater than 0.8 in some configurations.

In the boundary region determination device 2, the square sum processing device 21 may obtain the square sum of the boundary determination values, and the comparison operation device 22 may compare the square sum of the boundary determination values with the threshold; however, a square root of the square sum of the boundary determination values may be obtained, rather than the square sum of the boundary determination values, and the square root of the square sum of the boundary determination values may be compared with at least one threshold. Consequently, the at least one threshold may be set based on the format (e.g., the square sum of the boundary determination values or the square root of the square sum of the boundary determination values) of the values compared by the comparison operation device 22.

The thresholds A and B may be set corresponding to a difference in the gradient of the oblique line that represents the conversion executed in the gamma correction processing device 82. In particular, the threshold B may be set to a value that is less than the value of the threshold A when the gradient of the oblique line in the ink saving mode is less than the gradient of the oblique line in the ordinary recording mode.

A Prewitt filter may be used as the differential filter, rather than the Sobel filter. Alternatively, another suitable boundary detection filter may be used. Such filters may be used alone or in certain combinations thereof.

As described above, when the boundary of the image to be recorded with the ink is detected, the threshold for the density gradient value in the ink saving mode may be set to be less than the threshold for the density gradient value in the ordinary recording mode; however, the process described above may be utilized when detecting the boundary of an image that is recorded in a laser printer with a recording material toner) by using a laser or another light source, such as, for example, a light-emitting diode. Consequently, a "recording material save mode" (e.g., a toner save mode) may be set, rather than the "ink saving mode." Corresponding image processing for sharpening the detected boundary of the image subsequently may be performed in such toner-based printers. Thus, the boundary of the image recorded in such toner-based printers also may be sharpened by applying the above-described processes to the toner-based printer.

While the moving average process is executed in the moving average processing device 20 in the above description, the moving average process may not be executed in particular configurations.

As described above, the single CPU 90 of the controller 8 may execute all of the processing steps. However, the present invention is not limited to this configuration. For example, the controller 8 may use one or more of a plurality of CPUs, an application-specific integrated circuit ("ASIC"), and a combination of the CPU(s) and the ASIC to execute the processing steps described above.

While the invention has been described in connection with various exemplary structures and illustrative embodiments, it will be understood by those skilled in the art that other variations and modifications of the structures, configurations, and embodiments described above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. An image data processing apparatus comprising:
a memory;
a mode information receiving device configured to receive information specifying a second recording mode that is different from a first recording mode; and
a controller configured to execute processes comprising:
setting an image recording mode for recording an image on a recording medium to the second recording mode when the mode information receiving device receives the information specifying the second recording mode, wherein the image is to be recorded on the recording medium with a second set of image density values when the image recording mode is set to the second recording mode, wherein the image is to be recorded on the recording medium with a first set of image density values when the image recording mode is set to the first recording mode, and wherein each image density value of the second set of image density values is less than a corresponding image density value of the first set of image density values;
storing image data corresponding to the image in the memory, the image data comprising a first density value for each pixel of a plurality of pixels arrayed in a matrix, wherein the first density value corresponds to the first recording mode;
converting the first density value for each pixel comprised in the image data to a second density value that is less than the first density value when the second recording mode is set as the image recording mode;
setting an image boundary determination threshold to one of a first threshold value and at least one second threshold value, wherein the image boundary determination threshold is set to the first threshold value when the first recording mode is set as the image recording mode, wherein the image boundary determination threshold is set to the at least one second threshold value when the second recording mode is set as the image recording mode, and wherein the at least one second threshold value is less than the first threshold value;
calculating a density gradient value for each pixel comprised in the image data based on one of the first density value for the each pixel and the second density value for the each pixel, wherein the density gradient value is calculated based on the first density value for the each pixel when the first recording mode is set as the image recording mode, wherein the density gradient value is calculated based on the second density value for the each pixel when the second recording mode is set as the image recording mode;
determining whether each pixel comprised in the image data corresponds to a boundary of the image based on the density gradient value for the each pixel and the image boundary determination threshold; and
generating driving data for an image recording apparatus such that an amount of recording material to be recorded on a region of the recording medium corresponding to the each pixel when the each pixel corresponds to a boundary of the image is less than an amount of recording material to be recorded on the region of the recording medium corresponding to the each pixel when the each pixel does not correspond to a boundary of the image, wherein the driving data is based on the first density value for the each pixel comprised in the image data when the first recording mode is set as the image recording mode, and wherein the driving data is based on the second density value for the each pixel comprised in the image data when the second recording mode is set as the image recording mode.

2. The image data processing apparatus according to claim 1, wherein, when the controller determines whether the each pixel comprised in the image data corresponds to the boundary of the image, the controller executes processes comprising:

determining that the each pixel comprised in the image data corresponds to the boundary of the image when the density gradient value is greater than or equal to the image boundary determination threshold, and determining that the each pixel comprised in the image data does not correspond to the boundary of the image when the density gradient value is less than the image boundary determination threshold.

3. The image data processing apparatus according to claim 1, wherein the mode information receiving device comprises:

a physical interaction interface configured to receive an input via physical interaction with the image data processing apparatus, the input providing information specifying a recording mode from among a plurality of recording modes, the plurality of recording modes comprising at least the first recording mode and the second recording mode.

4. The image data processing apparatus according to claim 1, wherein the controller comprises the mode information receiving device, and wherein the mode information receiving device is configured to receive a signal from an external device, the signal comprising information specifying a recording mode from among a plurality of recording modes, and the plurality of recording modes comprising at least the first recording mode and the second recording mode.

5. The image data processing apparatus according to claim 1, wherein the controller is further configured to execute the process of converting the first density value to the second density value using a gamma correction process.

6. The image data processing apparatus according to claim 5, wherein the controller is further configured to execute an error diffusion process after converting the first density value to the second density value using the gamma correction process.

7. The image data processing apparatus according to claim 1, wherein the recording material comprises ink.

8. The image data processing apparatus according to claim 1, wherein the controller is further configured to execute the process of setting the image boundary determination threshold based on an arithmetic processing characteristic of a filtering process used to calculate the density gradient value.

9. The image data processing apparatus according to claim 1, wherein the driving data for the image recording apparatus comprises ink ejection data specifying a size of an ink droplet to be formed when the ink corresponding to each pixel of the plurality of pixels is ejected, the each pixel corresponding to a particular density gradient value, and wherein the controller is further configured to execute processes comprising:

setting the image boundary determination threshold to the at least one second threshold value when the second recording mode is set as the image recording mode, wherein the at least one second threshold value comprises a particular second threshold value and another second threshold value that is less than the particular second threshold value;

determining that the each pixel corresponds to a first type of boundary when the particular density gradient value is greater than or equal to the particular second threshold value;

determining that the each pixel corresponds to a second type of boundary when the particular density gradient value is greater than or equal to the other second threshold value hut is less than the particular second threshold value; and generating the ink ejection data for the particular pixel, wherein the size of the ink droplet to be formed when it is determined that the particular pixel corresponds to one of the first type of boundary and the second type of boundary is less than the size of the ink droplet to be formed when it is determined that the particular pixel corresponds to neither the first type of boundary nor the second type of boundary, and wherein the size of the ink droplet to be formed when it is determined that the particular pixel corresponds to the first type of boundary is less than the size of the ink droplet to be formed when it is determined that the particular pixel corresponds to the second type of boundary.

10. The image data processing apparatus according to claim 1, wherein the driving data for the image recording apparatus comprises ink ejection data specifying a size of an ink droplet to be formed when the ink corresponding to each pixel of the plurality of pixels is ejected, the each pixel corresponding to a particular density gradient value, and wherein the controller is further configured to execute processes comprising:

setting the image boundary determination threshold to the at least one second threshold value when the second recording mode is set as the image recording mode, wherein the at least one second threshold value comprises a particular second threshold value and another second threshold value that is less than the particular second threshold value;

generating the ink ejection data for the each pixel, wherein the ink ejection data specifies a type of ink droplet to be formed that corresponds to the each pixel to be one of a large droplet size, a medium droplet size, a small droplet size, or non-ejection of the droplet;

determining that the particular pixel corresponds to a first type of boundary when the particular density gradient value is greater than or equal to the particular second threshold value;

determining that the particular pixel corresponds to a second type of boundary when the particular density gradient value is greater than or equal to the other second threshold value but is less than the particular second threshold value;

changing the ink ejection data to specify that the type of ink droplet to be formed that corresponds to the particular pixel is the small droplet size in response to determining that the particular pixel corresponds to the first type of boundary when the ink ejection data specifies that the type of ink droplet to be formed that corresponds to the particular pixel is one of the large droplet size and the medium droplet size; and changing the ink ejection data to specify that the type of ink droplet to be formed that corresponds to the particular pixel is the medium droplet size in response to determining that the particular pixel corresponds to the second type of boundary when the ink ejection data specifies that the type of ink droplet to be formed that corresponds to the particular pixel is the large droplet size; and changing the ink ejection data to specify that the type of ink droplet to be formed that corresponds to the particular pixel is the small droplet size in response to determining that the particular pixel corresponds to the second type of boundary when the ink ejection data specifies that the type of ink droplet to be formed that corresponds to the particular pixel is the medium droplet size.

11. An image boundary detection device comprising:
a memory;
a mode information receiving device configured to receive information specifying a second recording mode that is different from a first recording mode; and
a controller configured to execute processes comprising:
  setting an image recording mode for recording an image on a recording medium to the second recording mode when the mode information receiving device receives the information specifying the second recording mode, wherein the image is to be recorded on the recording medium with a second set of image density values when the image recording mode is set to the second recording mode, wherein the image is to be recorded on the recording medium with a. first set of image density values when the image recording mode is set to the first recording mode, and wherein each image density value of the second set of image density values is less than a corresponding image density value of the first set of image density values;
  storing image data corresponding to the image in the memory, the image data comprising a first density value for each pixel of a plurality of pixels arrayed in a matrix, wherein the first density value corresponds to the first recording mode;
  converting the first density value for each pixel comprised in the image data to a second density value that is less than the first density value when the second recording mode is set as the image recording mode;
  setting an image boundary determination threshold to one of a first threshold value and a second threshold value, wherein the image boundary determination threshold is set to the first threshold value when the first recording mode is set as the image recording mode, wherein the image boundary determination threshold is set to the second threshold value when the second recording mode is set as the image recording mode, and wherein the second threshold value is less than the first threshold value;
  calculating a density gradient value for each pixel comprised in the image data based on one of the first density value for the each pixel and the second density value for the each pixel, wherein the density gradient value is calculated based on the first density value for the each pixel when the first recording mode is set as the image recording mode, wherein the density gradient value is calculated based on the second density value for the each pixel when the second recording mode is set as the image recording mode; and
  determining whether each pixel comprised in the image data corresponds to a boundary of the image based on the density gradient value for the each pixel and the image boundary determination threshold.

12. A boundary detection method comprising:
storing image data corresponding to an image in a memory, the image data comprising a first density value for each pixel of a plurality of pixels arrayed in a matrix, wherein the first density value corresponds to a first recording mode;
receiving information specifying a second recording mode that is different from the first recording mode;
setting an image recording mode for recording the image on a recording medium to the second recording mode when the information specifying the second recording mode is received, wherein the image is to be recorded on the recording medium with a second set of image density values when the image recording mode is set to the second recording mode, wherein the image is to be recorded on the recording medium with a first set of image density values when the image recording mode is set to the first recording mode, and wherein each image density value of the second set of image density values is less than a corresponding image density value of the first set of image density values;
converting the first density value for each pixel comprised in the image data to a second density value that is less than the first density value when the second recording mode is set as the image recording mode;
setting an image boundary determination threshold to one of a first threshold value and a second threshold value, wherein the image boundary determination threshold is set to the first threshold value when the first recording mode is set as the image recording mode, wherein the image boundary determination threshold is set to the second threshold value when the second recording mode is set as the image recording mode, and wherein the second threshold value is less than the first threshold value;
calculating a density gradient value for each pixel comprised in the image data based on one of the first density value for the each pixel and the second density value for the each pixel, wherein the density gradient value is calculated based on the first density value for the each pixel when the first recording mode is set as the image recording mode, wherein the density gradient value is calculated based on the second density value for the each pixel when the second recording mode is set as the image recording mode; and
determining whether each pixel comprised in the image data corresponds to a boundary of the image based on the density gradient value for the each pixel and the image boundary determination threshold.

13. A non-transitory computer-readable storage medium storing computer-readable instructions therein, the computer-readable instructions configured to instruct a processor to execute a process comprising:
storing image data corresponding to an image in a memory, the image data comprising a first density value for each pixel of a plurality of pixels arrayed in a matrix, wherein the first density value corresponds to a first recording mode;
receiving information specifying a second recording mode that is different from the first recording mode;
setting an image recording mode for recording the image on a recording medium to the second recording mode when the information specifying the second recording mode is received, wherein the image is to be recorded on the recording medium with a second set of image density values when the image recording mode is set to the second recording mode, wherein the image is to be recorded on the recording medium with a first set of image density values when the image recording mode is set to the first recording mode, and wherein each image density value of the second set of image density values is less than a corresponding image density value of the first set of image density values;

converting the first density value for each pixel comprised in the image data to a second density value that is less than the first density value when the second recording mode is set as the image recording mode;

setting an image boundary determination threshold to one of a first threshold value and a second threshold value, wherein the image boundary determination threshold is set to the first threshold value when the first recording mode is set as the image recording mode, wherein the image boundary determination threshold is set to the second threshold value when the second recording mode is set as the image recording mode, and wherein the second threshold value is less than the first threshold value;

calculating a density gradient value for each pixel comprised in the image data based on one of the first density value for the each pixel and the second density value for the each pixel, wherein the density gradient value is calculated based on the first density value for the each pixel when the first recording mode is set as the image recording mode, wherein the density gradient value is calculated based on the second density value for the each pixel when the second recording mode is set as the image recording mode; and determining whether each pixel comprised in the image data corresponds to a boundary of the image based on the density gradient value for the each pixel and the image boundary determination threshold.

* * * * *